US010065489B2

United States Patent
Wang et al.

(10) Patent No.: US 10,065,489 B2
(45) Date of Patent: Sep. 4, 2018

(54) DRIVE AXLE OF ELECTRIC DISTRIBUTION TORQUE

(71) Applicant: Jilin University, China, Changchun (CN)

(72) Inventors: Junnian Wang, Changchun (CN); Nana Sun, Changchun (CN); Xiusen Li, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 122 days.

(21) Appl. No.: 15/018,716

(22) Filed: Feb. 8, 2016

(65) Prior Publication Data

US 2017/0023114 A1 Jan. 26, 2017

(30) Foreign Application Priority Data

Feb. 11, 2015 (CN) .......................... 2015 1 0072654

(51) Int. Cl.
   *B60K 1/00* (2006.01)
   *F16H 48/36* (2012.01)
   (Continued)

(52) U.S. Cl.
   CPC ................ *B60K 1/00* (2013.01); *B60K 17/16* (2013.01); *B60K 23/04* (2013.01); *F16H 48/36* (2013.01); *B60K 2001/001* (2013.01); *B60K 2007/0092* (2013.01); *B60K 2023/043* (2013.01); *F16H 1/46* (2013.01); *F16H 48/08* (2013.01); *F16H 2048/364* (2013.01)

(58) Field of Classification Search
   None
   See application file for complete search history.

(56) References Cited

U.S. PATENT DOCUMENTS

2006/0025273 A1* 2/2006 Gradu .................... B60K 23/04
                                                            475/225
2008/0300086 A1* 12/2008 Wheals .................. B60K 17/16
                                                            475/248
(Continued)

FOREIGN PATENT DOCUMENTS

CN        204553754 U  *  8/2015  ............. F16H 48/06
DE    102012016508 A1  *  5/2014  ............. F16H 48/36

*Primary Examiner* — Robert W Hodge
*Assistant Examiner* — Lori Wu
(74) *Attorney, Agent, or Firm* — Wayne & King LLC

(57) ABSTRACT

An electric drive axle comprises: a housing; a drive motor having an output shaft for outputting torque; a main reducer configured to perform two-stage reduction to amplify the torque outputted from the output shaft; a differential including a differential housing, a planetary gear shaft, a left and right drive shafts rotating about an axis of rotation; a torque vectoring motor; a double row planetary gear reduction mechanism configured to amplify power outputted from the torque vectoring motor; a double row planetary gear torque vectoring mechanism connected to the double row planetary gear reduction mechanism and configure to receive torque outputted from the double row planetary gear reduction mechanism and output reverse torque in contrast to the torque received; and a single row double planetary gear coupling mechanism providing opposite direction torques to the left and right drive shafts respectively.

2 Claims, 8 Drawing Sheets

(51) Int. Cl.
    *B60K 17/16*      (2006.01)
    *B60K 23/04*      (2006.01)
    *F16H 48/08*      (2006.01)
    *F16H 1/46*      (2006.01)
    *B60K 7/00*      (2006.01)

(56) References Cited

U.S. PATENT DOCUMENTS

| | | | |
|---|---|---|---|
| 2015/0152947 A1* | 6/2015 | Smetana | F16H 48/36 475/5 |
| 2016/0003337 A1* | 1/2016 | Smetana | F16H 48/36 475/5 |
| 2016/0146322 A1* | 5/2016 | Knoblauch | B60K 1/00 475/150 |
| 2016/0341307 A1* | 11/2016 | Nakayama | B60K 17/16 |
| 2017/0051816 A1* | 2/2017 | Meixner | B60K 17/344 |
| 2017/0129333 A1* | 5/2017 | Meixner | B60K 17/16 |

\* cited by examiner

DRIVE AXLE OF ELECTRIC DISTRIBUTION TORQUE

FIELD OF INVENTION

The present invention belongs to the field of drive axles of automobiles, in particular to the electric drive axle of torque vectoring.

BACKGROUND OF THE INVENTION

Drive axle is an important part of automotive driveline, mainly consisting of the main reducer, differential, drive shaft and drive axle shell. As the name implies, the electric drive axle is driven by a motor drive axle. The electric drive axle is an important power transmission unit of the electric car, and the torque vectoring mechanism is the most important functional component of the electric drive axle with torque vectoring function. By controlling the motor and the planetary gear mechanism, it can achieve the torque coupling between the differential case and the drive shaft, hence enabling torque distribution between wheels.

Automotive differentials are the main components of the drive axle. Differentials function to transmit power to the left and right drive shafts of the car and at the same time allow the drive shafts rotating at different speed, in order to satisfy the wheels at both sides of the car as much as possible with the form of pure rolling, and hence reduce tire friction on the ground. When the car turns, the wheels at the outside of the corners are faster than those at the inside. A differential is arranged between the drive wheels at both sides of the vehicle to compensate for the different speed of the drive wheels. However, the conventional differentials usually evenly distribute torque between the driving wheels at both sides. In order to achieve optimum control of the vehicle, the drive wheels on the outside should output greater torque than that on the inside. In fact, increasing the torque applied on the drive wheel at the outside of the corners can promote and guide the vehicle in turn, which is particularly useful for high-speed cornering, and greatly reduces understeering, improves mobility and ultimate cornering ability, and increases driving fun. The differential of electric torque vectoring is an important configuration for luxury sports cars and SUVs.

In addition, the drive wheel may be on different roads with differential adhesion coefficient, namely the bisectional road. In this case, if the adhesive force of the drive wheel at one side is very small, for example on ice, the equal torque distribution characteristic of the conventional differential causes the wheel at this side acceleration skid, while the wheel at the other side with strong adhesion to the ground is unable to obtain sufficient driving force for running, then the car will break down and is unable to get off the hook. Of course, anti-slip differential can effectively avoid the low-speed break-down problem. However, when the car is on a good road and in high speed cornering, the anti-slip differential will make the wheels at both sides tend to have the same speed, and limit increase of the torque and speed of the outer wheel, which will lead to the insufficient cornering phenomenon, and limit the cornering ability of the vehicle.

Therefore, a new electric drive axle of torque vectoring is designed based on the structure of the drive axle with conventional bevel gear differential.

SUMMARY OF THE INVENTION

The present invention designs and develops a kind of electric drive axle with torque vectoring function, to solve the defects that the torque can be only evenly distributed to the left and right wheels in the prior art, so as to vary torque inputted from the drive shaft to the left and right wheels according to actual needs.

The technical solutions of the present invention are as follows:

An electric drive axle of torque vectoring, comprises:

a drive motor having an output shaft for outputting torque;

a main reducer for performing two-stage reduction to amplify the torque outputted from the output shaft; wherein the main reducer comprises a primary drive gear with a first gear shaft connected with the output shaft, a primary driven gear driven by the primary drive gear, a secondary drive gear sharing a second gear shaft with the primary driven gear, and a second driven gear driven by the second drive gear;

a differential for distributing the amplified torque received from the main reducer to a first and second drive shafts; wherein the differential comprises a differential case fixedly connected to the second driven gear, a planetary gear shaft, an upper and lower planetary gears respectively arranged on two ends of the planetary gear shaft, and a first and second bevel gears respectively connected with the first and second drive shafts;

a torque vectoring apparatus for torque vectoring; and a drive axle housing having a first, second and third cavities; wherein the first and second cavities are coaxially arranged and communicated, and the second and third cavities are radially connected; and the torque vectoring apparatus is mounted in the first cavity, the differential is mounted in the second cavity, and the main reducer is mounted in the second and third cavities;

wherein the torque vectoring apparatus comprises:

a torque vectoring motor having an inner rotor for outputting torque;

a planetary gear reduction mechanism for receiving the torque from the inner rotor of the torque vectoring motor, and reducing the speed to amplify the torque;

a torque vectoring mechanism connected to said planetary gear reduction mechanism, for receiving the torque from the planetary gear reduction mechanism, and outputting the reverse torque in contrast to said torque received; and a planetary gear coupling mechanism, comprising:

a carrier for receiving said reverse torque from the torque vectoring mechanism;

a ring gear fixedly connected with the differential case, wherein the ring gear and the differential case are configured to rotate together; and a sun gear fixedly connected with the first drive shaft.

Preferably, the planetary gear reduction mechanism comprises a first reduction planetary gear train and a second reduction planetary gear train arranged in series, which have a common ring gear fixed on the drive axle housing; a planetary carrier of the first reduction planetary gear train and a sun gear of the second reduction planetary gear train are fixedly connected; a sun gear of the first reduction planetary train and the inner rotor of the torque vectoring motor are fixedly connected; a planetary carrier of the second reduction planetary gear train is configured to output power.

Preferably, the torque vectoring mechanism is comprises a first torque vectoring planetary gear train and a second torque vectoring planetary gear train having a common sun gear; the common sun gear is rotatably sleeved on a shaft of the planetary gear reduction mechanism; a ring gear of the first torque vectoring planetary gear train is fixedly connected with a carrier of the second reduction planetary gear train; a carrier of the first torque vectoring planetary gear train is fixedly connected with the shaft of the planetary gear reduction mechanism; a ring gear of the second torque vectoring planetary gear train is stationary; a carrier of the second torque vectoring planetary gear train is configured to output power.

Preferably, the planetary gear coupling mechanism is a single row of double planetary gear train, and the double planetary gear train comprises:

the carrier connected with said carrier of the second torque vectoring planetary gear fixedly; and shared by two intermeshing planetary gears;

the ring gear fixedly connected with the differential case; wherein the ring gear is capable of rotating together with the differential case; and the sun gear fixedly connected with the first drive shaft.

Preferably, planetary gears of the first and second reduction planetary gear reduction train are configured with the same gear number and size.

Preferably, the shaft of the planetary reduction mechanism is configured to pass through the inner rotor.

The beneficial effects of the present invention are as follows:

The electric drive axle with torque vectoring function of the present invention is capable of distributing the drive torque to the drive shafts at both sides selectively. When the torque is distributed, the electric drive axle is willing at the best to follow driver's input, so as to maintain the driving speed when cornering, which increases mobility and the driver's driving pleasure.

The double row planetary gear torque vectoring mechanism is simultaneously with both the torque coupling function and deceleration function, which reduces the requirement to the torque of the torque vectoring motor. The torque vectoring motor can be arranged coaxially with the torque vectoring mechanism. The motor is off following rotation when it is free of torque vectoring. Only when active torque vectoring is required, the motor rotates for torque vectoring, which facilitates motor type selection, energy saving, wear reduction, compact structure, and small footprint.

Only one torque vectoring motor is needed to achieve torque vectoring, which facilitates compact structure and easy control. That is to say, just by controlling the rotor of torque vectoring motor forward and reverse, it can achieve torque vectoring on the left and right drive shafts, so as to control the torque difference between the left and right drive shafts. However, other differentials based on the clutch or brake with coupling gear need two sets of clutches or brakes as a power source simultaneously, which are of too many parts, complex structure, and large power consumption.

The present invention is wide range of applications. Although the present invention is designed in accordance with the electric drive axle, the present invention can also be applied to cars with conventional power sources if the composition of the traditional internal combustion engine and transmission powertrain replaces to drive motor of the present invention.

Since the present invention is an improvement of the existing foundation cone structure of the bevel gear differential commonly used, the alteration cost is very low, and the inheritance of manufacturing procedure and process is very good.

DETAILED DESCRIPTION OF PREFERRED EMBODIMENTS

The present invention will be further described in detail with reference to the accompanying drawings, so as to enable those skilled in the art to implement the present invention according to the disclosure.

As used herein, the term "left" refers to the direction distal to the drive motor and the term "right" refers to proximal to the drive motor.

Figure 1:
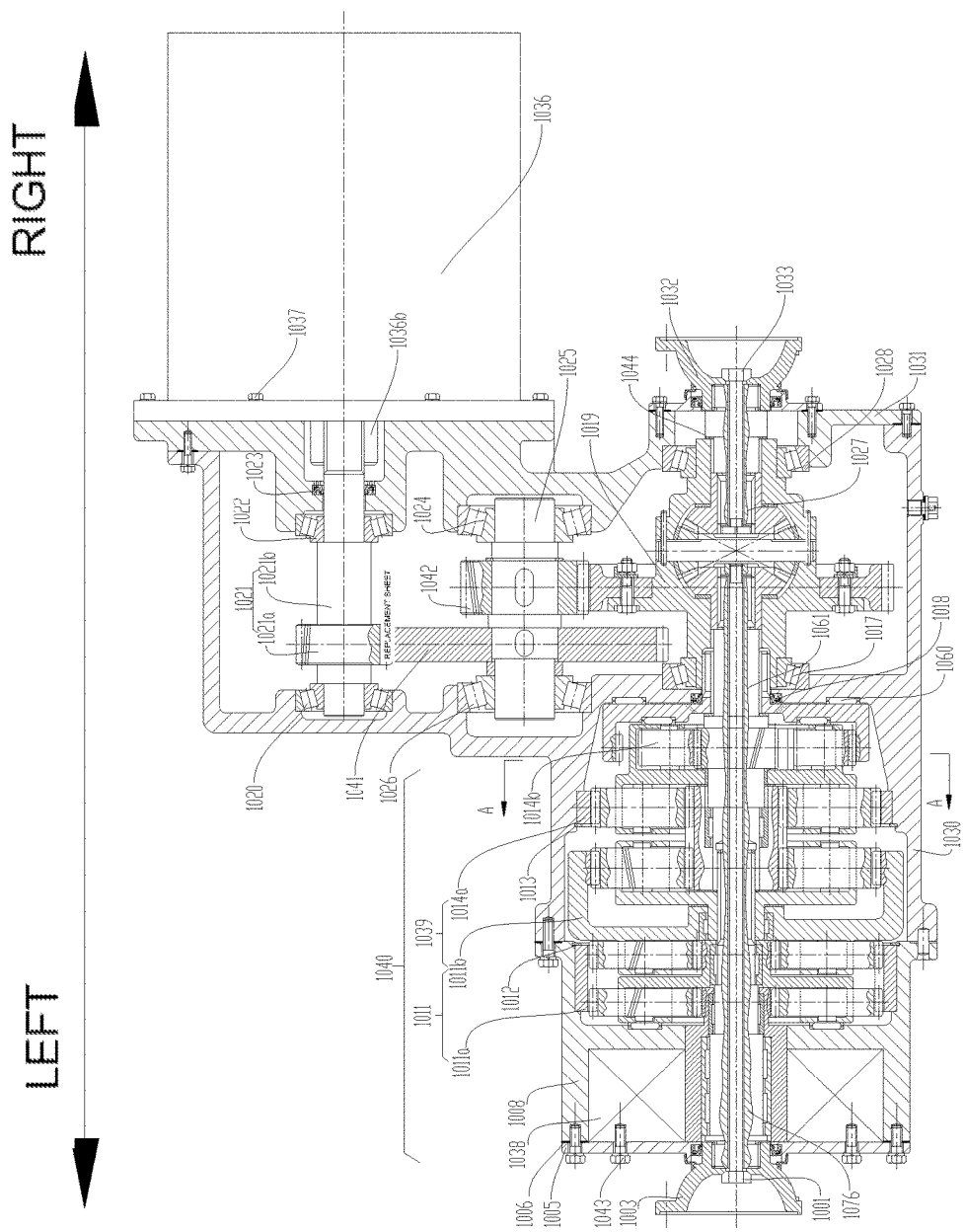
FIG. 1 is an overall structural diagram of an electric drive axle with torque vectoring function of the present invention.
Figure 2:
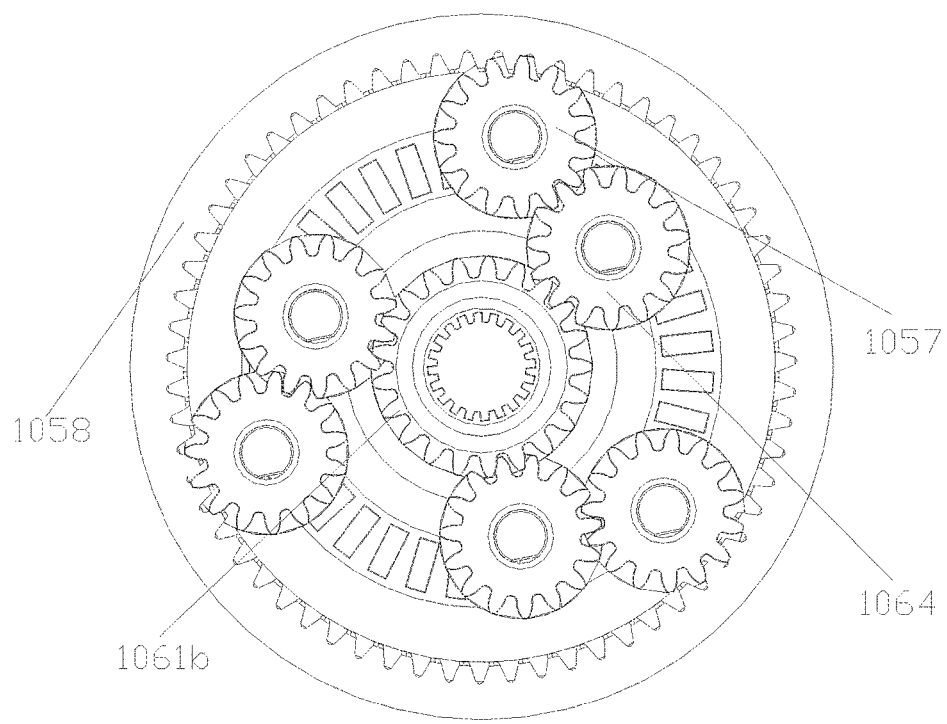
FIG. 2 is a partial cross-sectional view of a single row double planetary gear coupling mechanism.
Figure 4:
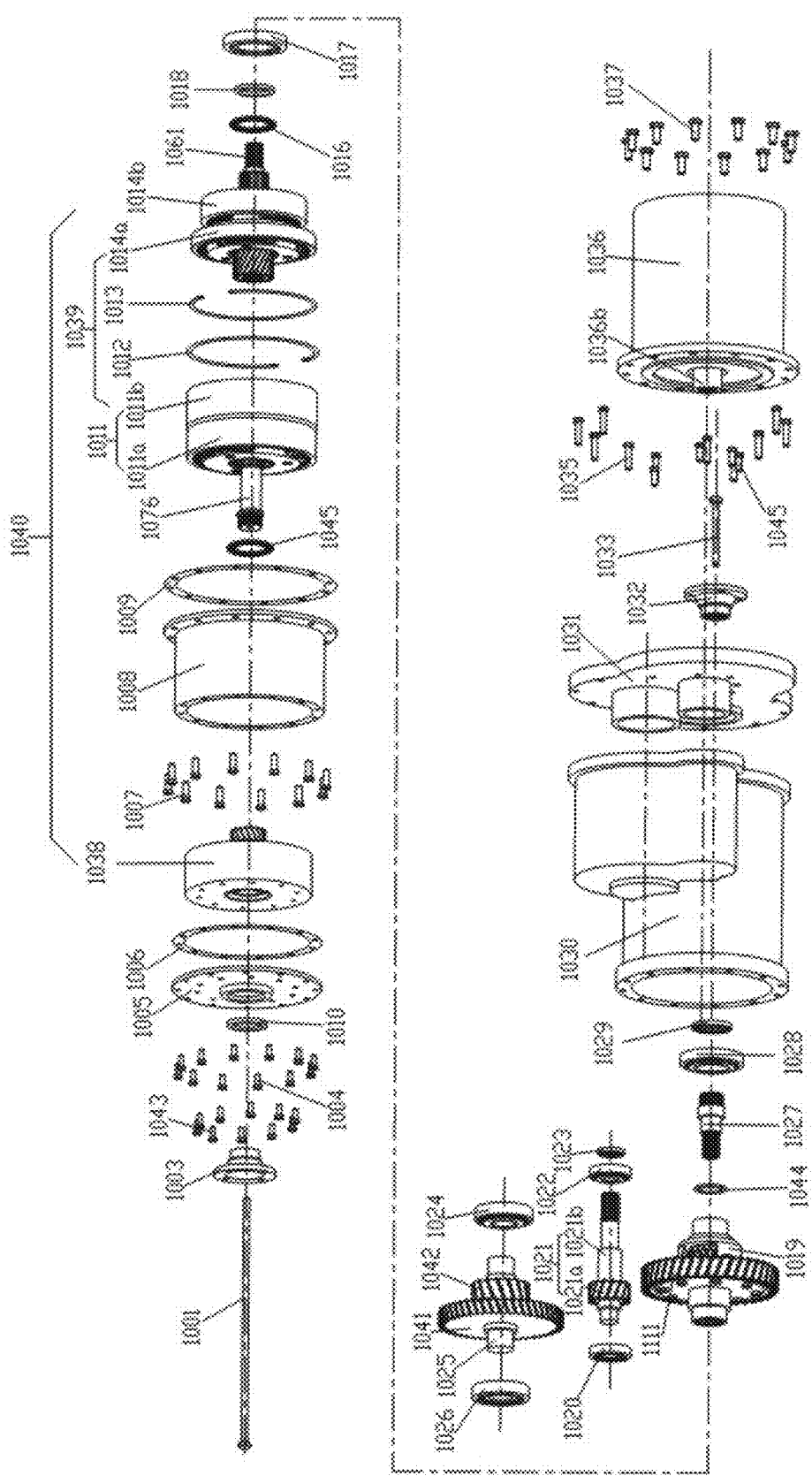
FIG. 4 is an axial exploded view of the drive axle with torque vectoring function of the present invention.

As shown in FIGS. 1 and 4, the present invention provides an electric drive axle having torque vectoring function, including a drive motor 1036, a main reducer, a differential 1019, a torque vectoring apparatus 1040, and a drive axle housing 1002.

The main reducer is configured to amplify the drive torque received from the drive motor 1036, and then the amplified torque is distributed to a left drive shaft 1061 and a right drive shaft 1027 of the car by the differential 1019. The internal splines of left drive shaft 1061 on the left end are connected to external splines of a left shaft 1076 connected to a left flange 1003, and hence the drive torque is transmitted to left shaft 1076 connected to the left flange 1003. Thus, the wheels at both sides rotate. Since the electric drive axle according to the present invention is provided with the torque vectoring apparatus 1040, the differential 1019 is capable of distributing the torque selectively to the left and right drive shafts 1061 and 1027 according to actual operating conditions. That is to say, the torques respectively distributed to the right and left wheels are unequal, and hence the drive torque difference exists. The drive torque difference improves the vehicle's ultimate driving ability to effectively adjust the vehicle's driving posture.

As shown in FIGS. 1 and 4, the left side of drive motor 1036 is positioned, and the drive motor 1036 is a permanent magnet synchronous motor with a output shaft 1036b with internal splines, which is the power source of the vehicle.

The axis of motor is arranged in parallel with the axis of the drive axle to save space. The drive motor 1036 is fixedly connected to a right end cap 1031 of the drive axle housing 1002 through 12 circumferentially uniform bolts 1037, and positioned by circular spigot protruded from a left side surface of the drive motor 1036. The drive motor 1036 is disposed at the right side of the drive axle so as to balance the weight of the torque vectoring apparatus 1040 at the left side, and hence to balance load on wheels at both sides of the vehicle.

As shown in FIG. 4, the main reducer is a two-stage helical gear reducer, which includes a first main reducer shaft 1021*b*, a primary drive gear 1021*a*, a second main reducer shaft 1025, a primary driven gear 1041, a secondary drive gear 1042 and a secondary driven gear 1111. One end of the first main reducer shaft 1021*b* is connected to the output shaft 1036*b* of the drive motor 1036 via the splines, and is supported in the drive axle main housing 1030 and the drive axle right end cap 1031 using a pair of tapered roller bearings 1020 and 1022 mounted face to face. At the right end of the tapered roller bearing 1022, a lip seal 1023 is disposed in the sink hole defined at a right end surface of the drive axle right end cap 1031, and the lip seal 1023 is sleeved on the neck journal at the right end of a first gear shaft 1021, to seal lubricating oil in the drive axle housing 1002 in vivo. The primary drive gear 1021*a* is a helical cylindrical gear. In fact, the primary drive gear 1021*a* may be integrally formed with the first main reducer shaft 1021*b*. Namely, the first gear shaft 1021 is a whole gear shaft. The primary driven gear 1041 is a helical cylindrical gear, which is connected with the second main reducer shaft 1025 by flat keys. The secondary drive gear 1042 is a helical cylindrical gear, which is connected with the second main reducer shaft 1025 by flat keys, and engaged with the secondary driven gear 1111 fixed to the left end of the flange on the differential case 1112. Two ends of the second main reducer shaft 1025 are supported on the drive axle main housing 1030 and the drive axle right end cap 1031 by a pair of tapered roller bearings 1024 and 1026 mounted face to face.

Figure 9:
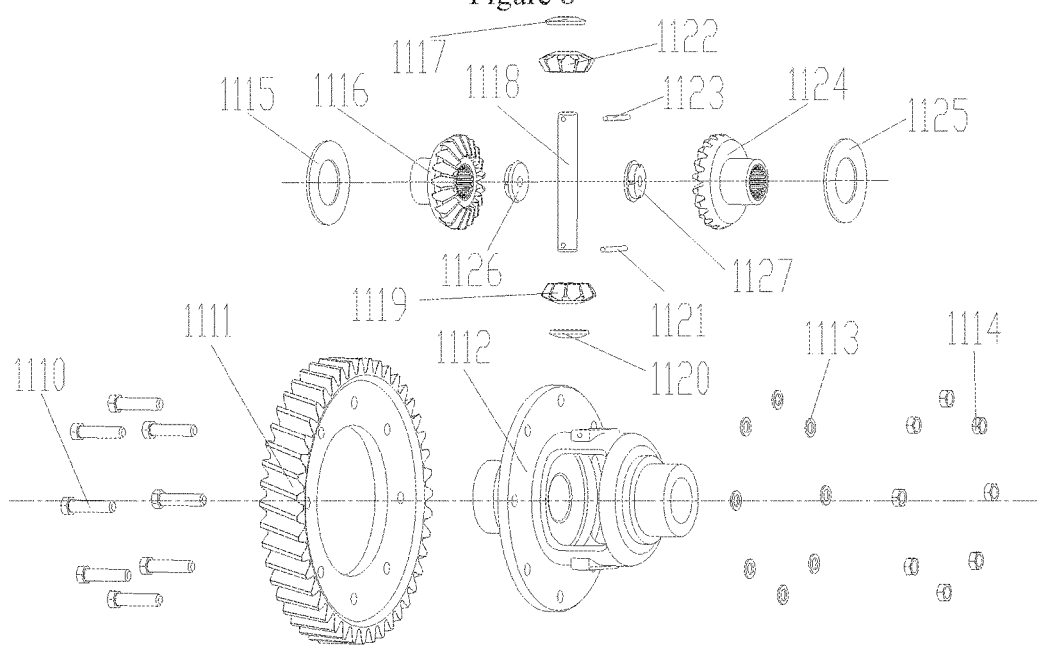
FIG. 9 is an axial exploded view of a differential.

As shown in FIGS. 1, 4 and 9, the differential 1019 is a conventional bevel gear differential, including the differential case 1112, a left and right bevel gears 1116 and 1124, two thrust washers 1115 and 1125, spring pins 1121 and 1123, a planetary gear shaft 1118, two coned planetary gears 1119 and 1122, and two planetary gear spherical washers 1117 and 1120. The differential case 1112 is a unitary housing and two square windows are defined therein to facilitate installation and input of the lubricating oil. The secondary driven gear 1111 is connected with the left circular flange of the differential case 1112 by six bolts 1110, spring washers 1113 and hex nuts 1114. The left bevel gear 1116, the left thrust washer 1115, the right bevel gear 1124, the right thrust washer 1125, the upper planetary gear 1122, the upper planetary gear spherical washer 1117, the lower planetary gear 1119, the lower planetary gear spherical washer 1120 and the planetary gear shaft 1118 are received in an inner cavity of the differential case 1112. The left and right bevel gears 1116 and 1124 are respectively mounted on opposite sides of the cavity of the differential case 1112, and are engaged with both the upper planetary gear 1122 and the lower planetary gear 1119 at the same time. The upper planetary gear 1122 and the upper planetary gear spherical washer 1117 are mounted to an upper end of the planetary gear shaft 1118, and the lower planetary gear 1119 and the lower planetary gear spherical washer 1120 are mounted to a lower end of the planetary gear shaft 1118. The upper and lower planetary gears 1122 and 1119, the upper and lower planetary gear spherical washers 1117 and 1120, and the planetary gear shaft 1118 together are fixed in the differential case 1112 by the upper and lower spring pins 1123 and 1121. Two ends of the differential 1019 are respectively supported on the drive axle main housing 1030 and the drive axle right end cap 1031 by a pair of tapered roller bearings 1017 and 1028 mounted face to face.

When the drive motor 1036 is working, the output shaft 1036*b* of the drive motor 1036 transfers the drive torque to the first gear shaft 1021, the drive torque is amplified by the primary drive gear and the secondary drive gear of the main reducer, and the amplified drive torque is transmitted to the differential case 1112. Thus, the differential case 1112 will be rotated about its axis; thereby the planetary gear shaft 1118 brings the upper planetary gear 1122 and the lower planetary gear 1119 to revolve around an axis of the left and right bevel gears. Since the left and right bevel gears 1116 and 1124 are engaged with the upper and lower planetary gears 1122 and 1119, they rotate about the axis of the left and right bevel gears simultaneously, and then the drive torque is evenly distributed to the left drive shaft 1061 and the right drive shaft 1027 spline connected the left and right bevel gears 1116 and 1124, and hence driving the vehicle. When the left drive shaft 1061 and right drive shaft 1027 are of different rotation speed, for example, when the vehicle turns, the upper and lower planetary gears 1122 and 1119 will rotate on the planetary gear shaft 1118 while revolving. At this time, the drive torque is also approximately evenly transmitted to the left and right bevel gears 1116 and 1124, and hence to the left and right drive shafts 1061 and 1027 spline connected to the left and right bevel gears 1116 and 1124, and hence driving the vehicle.

As shown in FIGS. 1 and 4, the torque vectoring apparatus 1040 is located at the left side of the drive axle, including a single row double planetary gear coupling mechanism 1014*b*, a double row planetary gear torque vectoring mechanism 1039, a double row planetary gear reduction mechanism 1011*a*, and a torque vectoring motor 1038.

Figure 3:
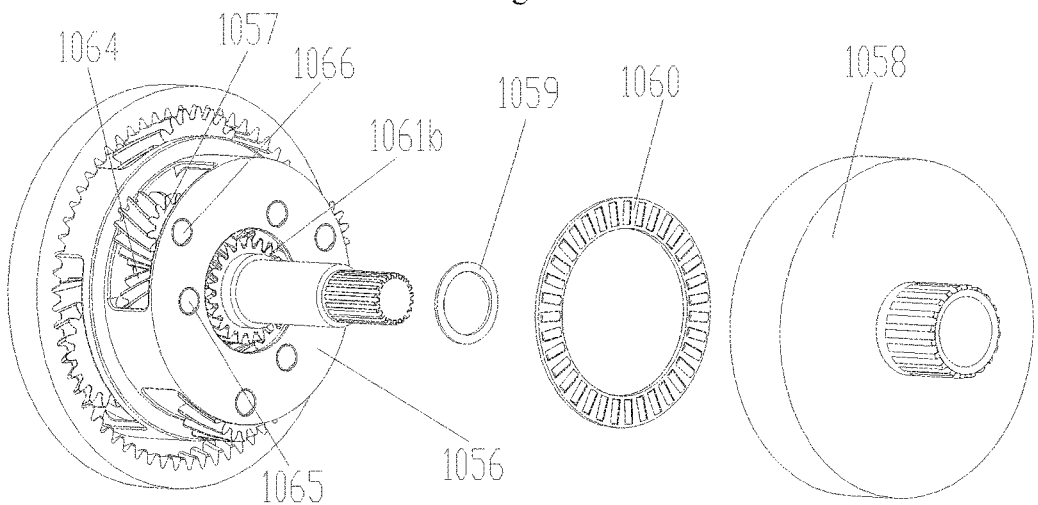
FIG. 3 is a partial exploded view of a single row double planetary gear coupling mechanism.
Figure 5:
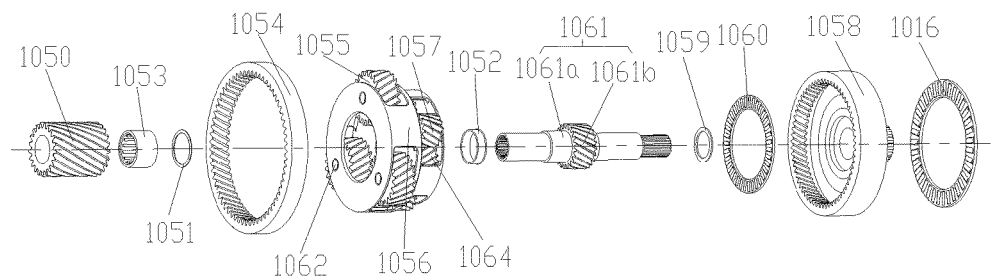
FIG. 5 is a three-dimension exploded view of a single row double planetary gear coupling mechanism and one part of a double row planetary gear torque vectoring mechanism.

As shown in FIGS. 1-3 and 5, the single row double planetary gear coupling mechanism 1014*b* includes a sun gear 1061*b*, three pairs of planetary gears 1064 and 1057, a planetary carrier 1056 and a ring gear 1058 connected with the differential case 1112. The sun gear 1061*b* and left drive shaft 1061*a* connected with the left drive shaft gear are formed integrally, therefore, the left drive shaft 1061*a* connected with the sun gear 1061*b* is actually a whole left drive shaft 1061. As shown in FIG. 5, since the splines provided on the right end of the left drive shaft 1061 is connected with the internal splines of the left bevel gear 1116 in the differential case 1112, the sun gear 1061*b* of the single row double planetary gear coupling mechanism 1014*b* is connected with the left bevel gear 1116 within the differential case 1112 and the sun gear 1061*b* and the left bevel gear 1116 rotate synchronously. Thus, the drive torque from the left drive shaft is directly transmitted. As shown in FIGS. 3 and 5, the ring gear 1058 connected with the differential case is consisted of a ring gear and a hollow shaft having external splines that are integrally formed. As shown in FIG. 1, the external splines provided on the shaft end of the ring gear 1058 connected with the differential case is connected to the internal splines on the left side of the differential case 1112. The inner wall of the ring gear 1058 is axially against on the right shoulder of the left drive shaft 1061. In order to reduce the wear between them, a washer 1059 is arranged at the shoulder of the left drive shaft 1061. In addition, as shown in FIG. 5, a thrust needle roller bearing 1060 is disposed at the bottom of a ring groove connected with the ring gear 1058 connected with the differential case and is axially supported on a right end surface of the carrier 1056 to reduce the friction during the relative rotation. As shown in FIGS. 1, 4 and 5, the back of the ring gear 1058 connected with the differential case is supported on a thrust needle roller bearing 1016 in a ring groove embedded inside the left cavity of the drive axle main housing 1030 to reduce friction during the relative rotation.

Figure 13:
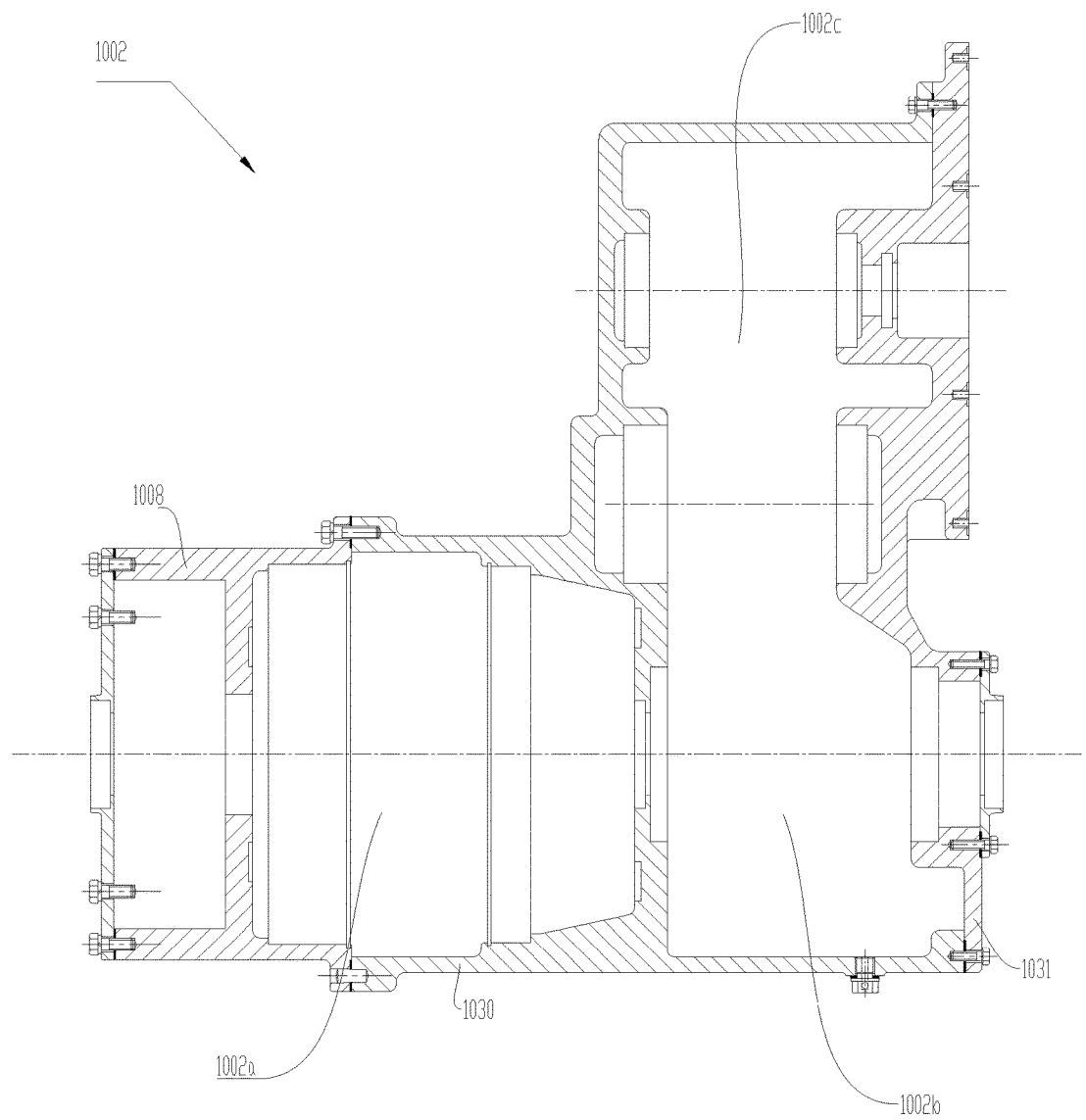
FIG. 13 is a schematic diagram of a drive axle housing with a 90 degree clockwise rotation as shown in FIG. 1.

As shown in FIG. 13, the drive axle housing 1002 comprises the drive axle main housing 1030, a drive axle left housing 1008 coupled to a left end of the drive axle main housing 1030, and the drive axle right end cap 1031 coupled to a right end of the drive axle main housing 1030 to form a first, second, and third cavities 1002a, 1002b and 1002c therein. The first and second cavities 1002a and 1002b are coaxially arranged and communicated, and the second and third cavities 1002b and 1002c are radially connected. In addition, as shown in FIGS. 1 and 4, a lip seal 1018 is received in the hollow shaft of the external splines of the ring gear 1058 connected with the differential case and in the hole of the first cavity 1002a of the drive axle main housing 1030. The first and second cavities 1002a and 1002b located at the left and right sides of the drive axle main housing 1030 are separated by the lip seal 1018, so as to avoid the main gear oil in the second cavity 1002b mixing with lightweight gear oil in the first cavity 1002a.

The three pairs of planetary gears, each including the inner and outer planetary gears 1064 and 1057 engaged with each other, are evenly mounted between the sun gear 1061b and the ring gear 1058 connected with the differential case. The inner and outer planetary gears 1064 and 1057 are mounted to the carrier 1056 together by pins 1065 and 1066, and rotate around their own pins. The outer planetary gears 1057 engage with the ring gear 1058 connected with the differential case without engaging with the sun gear 1061b. The inner planetary gears 1064 engage with the sun gear 1061b without engaging with the ring gear 1058 connected with the differential case. In addition, each pair of inner planetary gears 1064 and outer planetary gears 1057 is assembled in pair, and engaged with each other. Therefore, the drive torque is transmitted from the differential case 1112 to the ring gear 1058 connected with the differential case, and then to the sun gear 1061b via the inner and outer planetary gears 1064 and 1057 on the ring gear 1058 connected with the differential case, namely to the left drive shaft 1061 with the left drive shaft gear. That is to say, any drive torque transmitted from the ring gear 1058 connected to the differential case to the sun gear 1061b will make the left drive shaft 1061 and the right drive shaft 1027 rotate in the same direction with the differential case 1112. For each gear and size selection of the single row double planetary gear coupling mechanism 1014b, appropriate parameters of the planetary row is selected according to the maximum designed torque vectoring ratio of the torque vectoring apparatus, then the teeth number of each gear is selected according to the primary size conditions.

As shown in FIGS. 1, 4 and 5, the double row planetary gear torque vectoring mechanism 1039 includes a right torque vectoring planetary gear train 1014a and a left torque vectoring planetary gear train 1011b which share a long sun gear 1050 and are configured with the same characteristic parameters planetary gear.

As shown in FIGS. 1 and 5, the right torque vectoring planetary gear train 1014a comprises the long sun gear 1050, three planetary gears 1055, a ring gear 1054 and the planetary carrier 1056. The long sun gear 1050 is mounted on the neck journal of the left drive shaft 1061 by a needle bearing 1053 placed in the hole defined on the right side of the long sun gear. Thus, the long sun gear 1050 and the left drive shaft 1061 are relatively rotatable to each other. As shown in FIGS. 1 and 4, the ring gear 1054 is fixedly connected to the left inner wall of the drive axle main housing 1030 with interference fit, and is axially fixed with an elastic ring 1013 disposed in a hole, so that the ring gear 1054 cannot rotate relatively to the drive axle main housing 1030. If necessary, the ring gear 1054 is welded to the drive axle main housing 1030 to overcome the drive torque. The three planetary gears 1055 are mounted evenly between the long sun gear 1050 and the ring gear 1054, and each rotates around a pin 1062 on the planetary carrier 1056. Simultaneously, the three planetary gears 1055 respectively engage with the long sun gear 1050 and the ring gear 1054. The planetary carrier 1056 is actually shared by the single row double planetary gear coupling mechanism 1014b and the right torque vectoring planetary gear train 1014a of the double row planetary gear torque vectoring mechanism 1039. Thus the single row double planetary gear coupling mechanism 1014b and the right torque vectoring planetary gear train 1014a are connected by the shared carrier. Actually, the single row double planetary gear coupling mechanism 1014b and the right torque vectoring planetary gear train 1014a of the double row planetary gear torque vectoring mechanism 1039 are assembled into a unit 1014. The middle of the carrier 1056 is supported on the second shoulder of the left drive shaft 1061 by a bushing 1052 with a dangling sleeve. The left side of the bushing 1052 abuts the right end surface of the long sun gear 1050 by a copper washer 1051. In addition, the right end surface of the carrier 1056 is supported at the bottom of the ring gear 1058 connected with the differential case by the thrust needle roller bearing 1060 embedded to the bottom of the inner wall groove of the ring gear 1058 connected with the differential case. The copper washer 1051, the bushing 1052, and the thrust needle roller bearing 1060 are used to reduce contact wear during relative movement between two contacted components.

Figure 6:
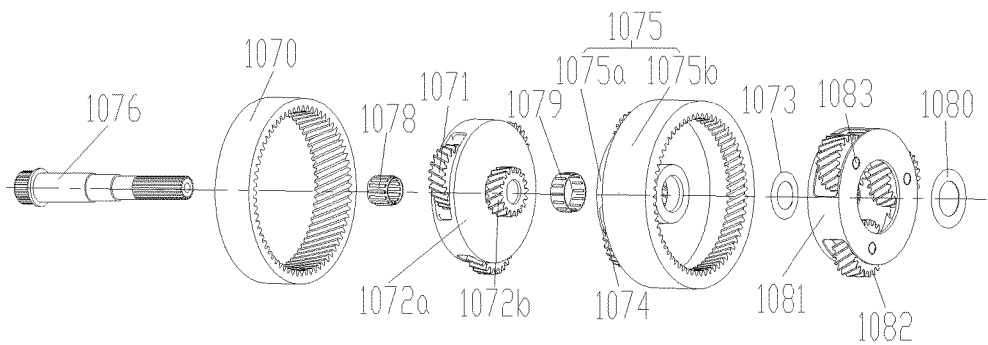
FIG. 6 is an exploded view of a double row planetary gear reduction mechanism and the other part of the double row planetary gear torque vectoring mechanism viewing from the right side.
Figure 7:
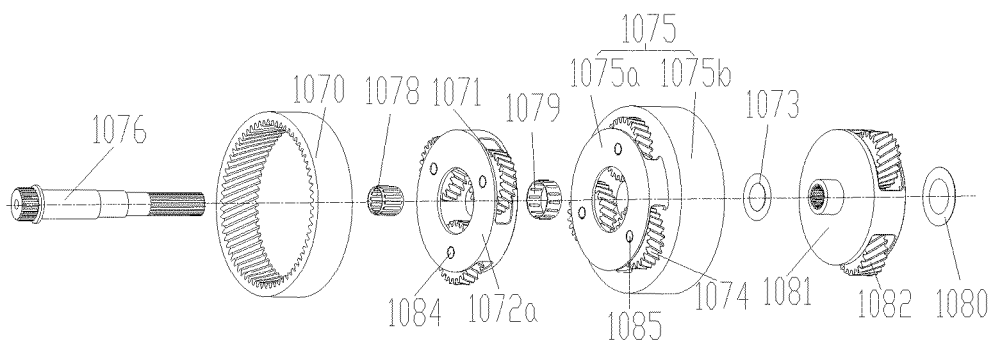
FIG. 7 is an exploded view of the double row planetary gear reduction mechanism and the other part of the planetary gear torque vectoring mechanism viewing from the left side.

As shown in FIGS. 1 6 and 7, the left torque vectoring planetary gear train 1011b comprises the long sun gear 1050, three planetary gears 1082, a ring gear 1075b and a planetary carrier 1081. The ring gear 1075b is fixedly connected to the planetary carrier 1075a of a right reduction planetary gear train of the double row planetary gear reduction mechanism 1011a. In fact, the ring gear 1075b and the planetary carrier 1075a of the right reduction planetary gear train of the double row planetary gear reduction mechanism 1011a are formed integrally, which forms a ring gear 1075 with the carrier. The ring gear 1075 with the carrier is arranged in the left most position of the driving axle main housing 1030, and is supported on the left neck journal of the planetary carrier 1081 via the needle roller bearing 1079. The three planetary gears 1082 are evenly installed between the sun gear 1050 and ring gear 1075b, and each rotates around a respective pin 1083 on the planetary carrier 1081. The three planetary gears 1082 are respectively meshed with the long sun gear 1050 and ring gear 1075b at the same time. An inner hole on the left neck journal of the carrier 1081 is coupled to the left shaft 1076 connected with the left flange 1003 via internal splines. The left and right sides of the planetary carrier 1081 are against the left side of long sun gear 1050 and the right inner wall of the ring gear 1075b respectively via anti-friction pads 1073 and 1080. Since the left shaft 1076 connected with the left flange and the left drive shaft 1061 are connected together by splines, the planetary carrier 1081, the left shaft 1076 connected with left flange, the left drive shaft 1061 with left gear, the left bevel gear 1116 and a left wheel of the car are connected together for synchronous rotation.

As shown in FIGS. 1 and 6-8, the double row planetary gear reduction mechanism 1011a comprises left and right rows of planetary gear trains which share a ring gear 1070 and are configured with the same planetary characteristic parameters, that is, a left reduction planetary gear train and a right reduction planetary gear train.

As shown in FIGS. 1, 6 and 7, the right reduction planetary gear train comprises a sun gear 1072b, three planetary gears 1074, the planetary carrier 1075a and the ring gear 1070. The sun gear 1072b and the carrier 1072a of the left reduction planetary gear train are formed integrally, which are supported on of a first section of linear shaft at the right end of the left shaft 1076 connected with left flange by a needle roller bearing 1078. The three planetary gears 1074 are uniformly arranged between the sun gear 1072b and the ring gear 1070, and each rotates around a respective pin 1085 on the planetary carrier 1075a. The planetary gears 1074 are respectively engaged with the sun gear 1072b and the ring gear 1070 at the same time. The planetary carrier 1075a and the ring gear 1075b of the left torque vectoring planetary gear train 1011b of the double row planetary gear torque vectoring mechanism 1039 are formed integrally, which is a ring gear 1075 with the carrier. The ring gear 1075 with the carrier connects the double row planetary gear reduction mechanism 1011a and the left torque vectoring planetary gear train 1011b of the double row planetary gear torque vectoring mechanism 1039 together to form an independent member 1011. The ring gear 1075 with the carrier is supported on the planetary carrier 1081 of the left torque vectoring planetary gear train 1011b of the double row planetary gear torque vectoring mechanism 1039 via the needle roller bearing 1079. In this way, the planetary carrier 1075a can rotate relatively to the planetary carrier 1081, that is, the planetary carrier 1075a can relatively rotate to the left shaft 1076 connected with left flange. In addition, the right end surface of the planetary carrier 1075a abuts the left big surface of the planetary carrier 1081 of the left torque vectoring planetary gear train 1011b of the double row planetary gear torque vectoring mechanism 1039. In order to decrease wear and tear caused by relative motion between the planetary carriers 1075a and 1081, an anti-friction pad 1080 is arranged therebetween. The ring gear 1070 is shared by the left and right reduction planetary gear trains of the double row-planetary gear reduction mechanism 1011a. The ring gear 1070 is installed in the right side of the drive axle left housing 1008 by interference fit and is axially fixed via an elastic ring 1012 disposed to a hole, so that the ring gear 1070 cannot rotate relatively to the drive axle left housing 1008. When necessary, the ring gear 1070 is welded to the drive axle left housing 1008.

Figure 8:
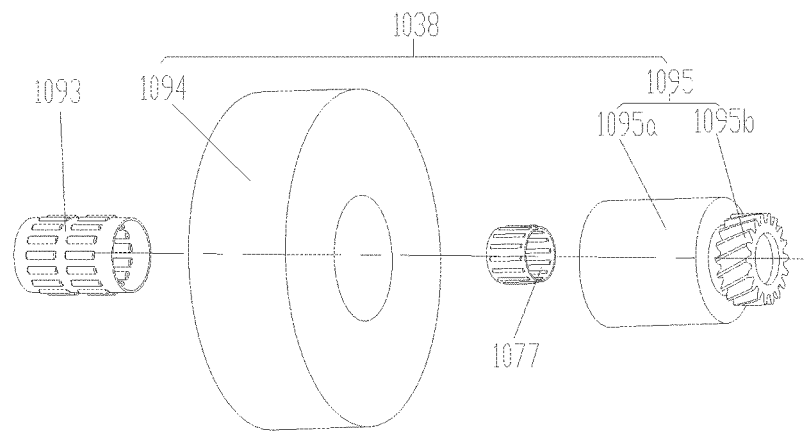
FIG. 8 is an axial exploded view of a torque vectoring motor.

As shown in FIGS. 1, 7 and 8, the left reduction planetary gear train comprises said the left shaft 1076, a sun gear 1095b, three planetary gears 1071, the planetary carrier 1072a and the ring gear 1070. The sun gear 1095b and an inner rotor 1095a of the torque vectoring motor 1038 are integrally formed, which are supported on the left shaft 1076 connected to the left flange by a needle roller bearing 1077. The three planetary gears 1071 are evenly installed between the sun gear 1095b and the ring gear 1070, and each rotates around a respective pin 1084 on the planetary carrier 1072a. The three planetary gears 1071 are respectively meshed with the sun gear 1095b and the ring gear 1070 simultaneously. The ring gear 1070 is shared by the left and right reduction planetary gear trains of the double row planetary gear reduction mechanism 1011a and is fixed inside the drive axle left housing.

As shown in FIGS. 1, 4 and 8, the torque vectoring motor 1038 of the torque vectoring apparatus 1040 is an inner rotor motor of hollow shaft type, which comprises an inner rotor 1095a and a stator 1094. The torque vectoring motor 1038 is installed in the left cavity of the drive axle left housing 1008. The right end surface of the stator 1094 is against a rib plate inside the drive axle left housing 1008, and the left end surface of the stator 1094 is fixed to a left end cap 1005 and a paper gasket 1006 together by 10 bolts 1043, so that it cannot rotate relatively to the drive axle left housing 1008. The left shaft 1076 connected to the left flange is disposed in the internal bore at the left end of the rotor 1095a of the torque vectoring motor 1038 by a double row needle roller bearing 1093 arranged on the neck journal of the third section linear shaft provided on the right end of the left shaft 1076. The rotor 1095a can rotate freely with respective to the left shaft 1076 connected to the left flange. In fact, the sun gear 1095b of the left torque vectoring planetary gear train of the double row planetary gear reduction mechanism 1011a in the torque vectoring apparatus 1040 and the rotor 1095a of the torque vectoring motor 1038 are formed integrally to become an independent member 1095.

As shown in FIGS. 1 and 13, the torque vectoring apparatus 1040 is mounted in the first cavity 1002a, the differential 1019 is mounted in the second cavity 1002b, and the main reducer is mounted in the second and third cavities 1002b and 1002c.

As shown in FIGS. 1, 4, 5 and 8, the drive shaft comprises the left drive shaft 1061, the left, the left shaft 1076 connected to left flange, and the right drive shaft 1027. The right end of the left drive shaft 1061 is connected with the left bevel gear 1116 by splines. The internal splines provided on the left end of the drive shaft 1061 is engaged with the external splines provided on the right end of the left shaft 1076 connected to the left flange, forming mutual support to each other. The left shaft 1076 connected to the left flange is a stepped hollow spline shaft, which comprises two splines provided on the right and left ends, a shoulder and three sections of linear shafts provided between the right and left ends. The left shaft 1076 connected to the left flange is inserted into the hollow portion of the rotor 1095a of the torque vectoring motor 1038. The left shaft 1076 connected to the left flange is supported in internal bore at the left end of the rotor 1095a of the torque vectoring motor 1038 by the needle roller bearing 1093 arranged on the neck journal of the third section linear shaft provided on the right end of the left shaft 1076. The needle roller bearing 1093 is against the 1 shaft shoulder of the left shaft 1076 connected to the left flange. The external splines of the left shaft 1076 is engaged with the internal splines of the left flange 1003, and the left flange 1003 is tightly locked to the end of the left shaft 1076 by a left long bolt 1001. To prevent the left drive shaft 1061 with left gear, and the left shaft 1076 connected to the left flange axially moving, the left long bolt 1001 extends from the left flange 1003 and successively passes through concentric holes of the left shaft 1076 connected to the left flange and left drive shaft 1061. The cone head of the left long bolt 1001 is firmly pressed on the cone end surface of the left flange 1003. The end of the left long bolt 1001 is provided with an external thread of small diameter, and is connected to a left anti-rotation nut 1126 via threaded connection. The left anti-rotation nut 1126 is connected with an internal spline hole of the left bevel gear 1116 via interference fit, and is flanging on the end surface of the left bevel gear 1116 for axial limitation. The right drive shaft 1027 is a litter shorter stepped hollow spline shaft, which comprises two splines provided on the left and right ends, and two sections of linear shaft provided between the left and right ends. The left end of the right drive shaft 1027 is connected to the right bevel gear 1124 by splines. The differential case 1112 is closely against the shoulder of the right drive shaft 1027 via an anti-friction spacer 1044. The external spline on the right end of the right drive shaft 1027 is connected with the inner spline of a right flange 1032. One end of the right flange 1032 is against the right end of the right drive shaft 1027, and the right flange 1032 is locked to the right drive shaft 1027 via a right long bolt 1033. In order to prevent axial movement of the right drive shaft 1027 and the right flange 1o32, the right long bolt 1033 is inserted into the bore in the right drive shaft 1027 from the right flange 1032. The cone head of the right long bolt 1033 is tightly pressed against the tapered end surface of the right flange 1032. The end of the right long bolt 1033 is provided with an external thread of small diameter, and the right long bolt 1033 is connected to a right anti-rotation nut 1127. The right anti-rotation nut 1127 is connected with the internal spline hole of the right bevel gear 1124 with interference fit, and is flanging on the end surface of the right bevel gear 1124.

Working principles of the present invention are as follows:

The torque vectoring motor 1038 of the torque vectoring apparatus 1040 is mounted between the left cavity of the drive axle left housing 1008 and the left end cap 1005. When the torque vectoring motor 1038 receives an electrical signal, the inner rotor 1095a of the torque vectoring motor 1038 starts rotating, which will lead to the sun gear 1095b on the inner rotor 1095a to rotate forward or reverse to output directionally distributed torque. The torque vectoring motor 1038 is controlled by a motor controller, and control commands from the motor controller is issued by the vehicle drive controller.

Figure 10:
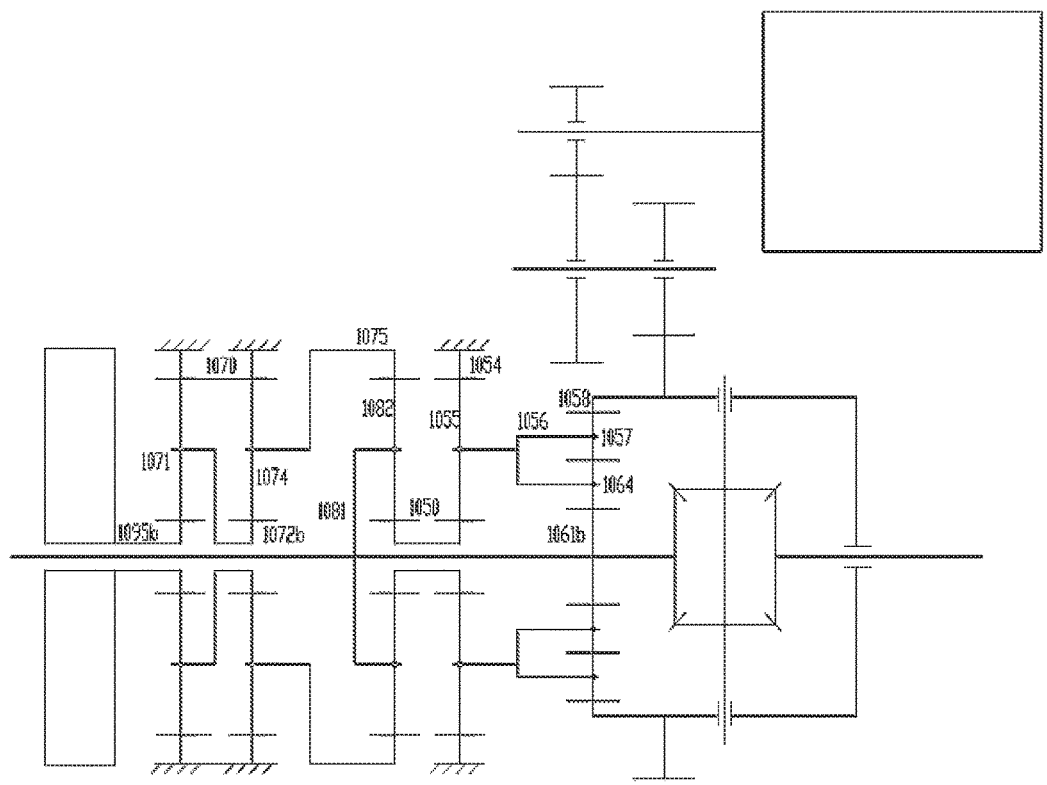
FIG. 10 is a schematic diagram of the drive axle with torque vectoring function of the present invention.

As shown in FIG. 10, when the vehicle is traveling straight, wheel speed on both sides of the vehicle is substantially the same, and the torque vectoring motor 1038 will not receive instructions of the controller. The torque vectoring apparatus 1040 can ensure the inner rotor 1095a of the torque vectoring motor 1038 not to rotate following the wheel, thereby reducing the induced electromotive force, improving driving efficiency and reducing the burden on the motor controller hardware. In this case, the torque vectoring apparatus 1040 does not affect the approximate equal distribution of drive torque at the left and right drive shafts. At this time, the differential case 1112, the ring gear 1058 connected to the differential case, the left drive shaft 1061, the sun gear 1061b, and the carrier 1056 rotate at the same speed. Thus, the double planetary gears of the single row double planetary gear coupling mechanism 1014b revolve at the same speed around the sun gear 1061b without rotation. Meanwhile, since the carrier 1081 of the left torque vectoring planetary gear train 1011b of the double row planetary gear torque vectoring mechanism 1039 is connected with the left shaft 1076 connected to the left flange fixedly via the splines, and the left shaft 1076 connected to the left flange is connected with the left drive shaft 1061 fixedly via splines, the speed of the planetary carrier 1056 shared by the single row double planetary gear coupling mechanism 1014b and the right torque vectoring planetary gear train 1014a of the double row planetary gear torque vectoring mechanism 1039 is the same as the speed of the carrier 1081 of the left torque vectoring planetary gear train 1011b of the double row planetary gear torque vectoring mechanism 1039. Meanwhile, the left and right torque vectoring planetary gear trains 1011b and 1014a of the double row planetary gear torque vectoring mechanism 1039, have the same characteristic parameter in the design. Namely, the size parameters of the planetary gears 1082 and 1055 of the left and right torque vectoring planetary gear trains 1011b and 1014a are the same, and the size parameters of the ring gears 1075b and 1054 are also the same. According to the kinematic equations of planetary gear train, the ring gears 1075b and 1054 of the left and right torque vectoring planetary gear trains 1011b and 1014a have the same rotation speed. The ring gear 1054 of the right torque vectoring planetary gear train 1014a is connected to the drive axle main housing 1030 and its speed is zero, therefore, the ring gear 1075b of the left torque vectoring planetary gear train 1011b is also zero. The carrier 1075a of the right reduction planetary gear train of the double row planetary gear reduction mechanism 1011a and the ring gear 1075b of the left torque vectoring planetary gear train 1011b of double row planetary gear torque vectoring mechanism 1039 are formed integrally. The ring gear 1070 shared by the left and right reduction planetary gear trains of the double row planetary gear reduction mechanism 1011a is fixedly connected with the drive axle left housing 1008. Therefore, the right reduction planetary gear train of the double row planetary gear reduction mechanism 1011a does not rotate, and the sun gear 1072b does not rotate either. Since the carrier 1072a of the left and right reduction planetary gear trains of the double row planetary gear reduction mechanism 1011a and the sun gear 1072a are integrally formed, the carrier 1072a of the left reduction planetary gear train of the double row planetary gear reduction mechanism 1011a does not rotate. Therefore, the left reduction planetary gear train of the double row planetary gear reduction mechanism 1011a does not rotate, and the sun gear 1095b does not rotate either. Namely, the rotor 1095a of the torque vectoring motor 1038 does not rotate. In other words, when the torque vectoring motor 1038 of the torque vectoring apparatus 1040 receives the electrical signal to work, the inner rotor 1095a of the torque vectoring motor 1038 and the sun gear 1095b start rotating, the planetary gear 1071 of the left reduction planetary gear train of the double row planetary gear reduction mechanism 1011a revolves around the sun gear 1095b at the same direction with the carrier 1072a, and the carrier 1072a is decelerated to output power. The planetary gears 1074 of the right reduction planetary gear train of the double row planetary gear reduction mechanism 1011a is driven by the sun gear 1072b to revolute at the same direction. The carrier 1075a of the right reduction planetary gear train and the ring gear 1075b of the left torque vectoring planetary gear train 1011b of the double row planetary gear torque vectoring mechanism 1039 decelerate together at the same direction to output power. Therefore, the ring gears 1075b and 1054 of the left and right torque vectoring planetary gear trains 1011b and 1014a of the double row planetary gear torque vectoring mechanism 1039 have a different speed (since the speed of the ring gear 1054 is zero). The left and right torque vectoring planetary gear trains 1011b and 1014a of the double row planetary gear torque vectoring mechanism 1039 share a common long sun gear 1050. That is to say, the speed of the sun gears of the left and right torque vectoring planetary gear trains 1011b and 1014a is the same. According to the planetary gear train kinematic formulas, the rotation speed of the carriers 1081 and 1056 of the left and right torque vectoring planetary gear trains 1011b and 1014a is different, namely the speed difference is generated. Further, since the planetary carrier 1081 of the left torque vectoring planetary gear train of the double row planetary gear torque vectoring mechanism 1039 is connected to the left drive shafts (the left drive shaft 1061 and the left shaft 1076 connected to the left flange) by splines, the planetary carrier 1081 of the double row planetary gear torque vectoring mechanism 1039 and the sun gear 1061*b* of the single row double planetary gear coupling mechanism 1014*b* have the same rotation speed. At this time, the sun gear 1061*b* and the carrier 1056 with different rotation speed will force the planetary gear 1057 of the single row double planetary gear coupling mechanism 1014*b* to rotate. That is to say, when the car goes straight, the differential is forced to generate a differential speed. Namely, the wheels at one side of the car are accelerated, while the wheels at the other side of the car are decelerated. However, when the car goes straight according to car kinematics, the wheels at both sides of the car rotate at the same speed inevitably, so that the differential speed leads to the drive torque unevenly distributed to the left and right sides, thus achieving torque vectoring.

Figure 11:
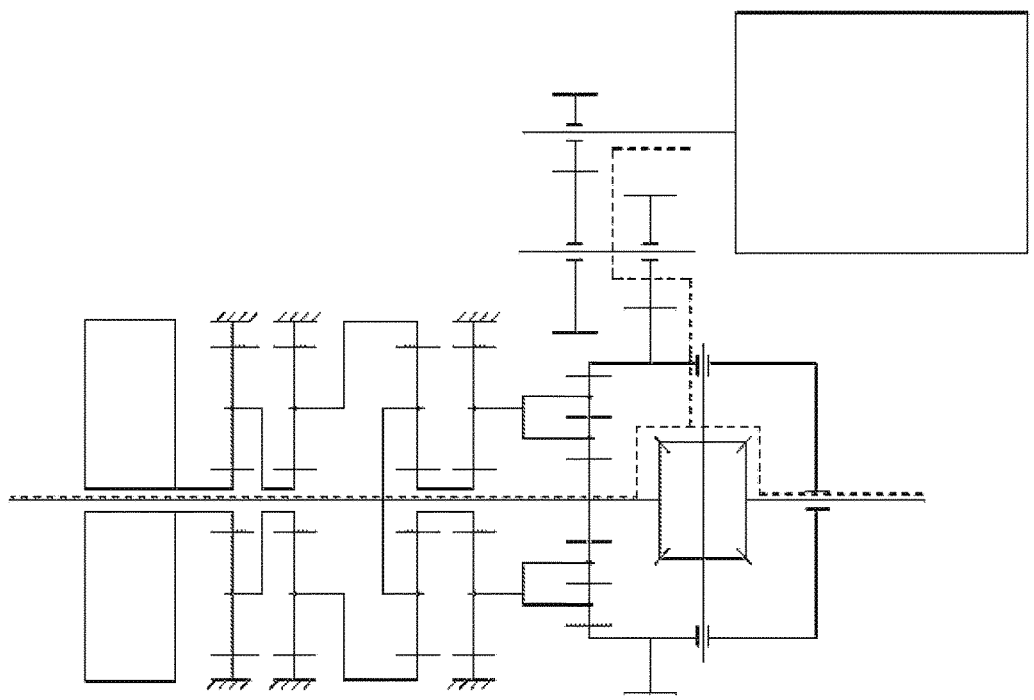
FIG. 11 is a schematic diagram of power flow of the drive axle with torque vectoring function of the present invention when the car goes straight.

Thus, under normal circumstances, when the vehicle goes straight, the torque vectoring motor 1038 does not receive any electrical signal, the inner rotor 1095*a* does not rotate. At this time, the differential 1019 functions the same as the conventional differential to evenly distribute the power and drive torque received from the drive motor 1036 to the left drive shafts (i.e. the left drive shaft 1061 with left gear and the left shaft 1076 connected to the left flange) and the right drive shaft 1027. The drive torque and power outputted from the drive motor 1036 is performed a two-stage deceleration by the main reducer, and is transmitted to the differential case 1112 from the secondary driven gear 1111, then to the planetary gear shaft 1118 fixed to the differential case 1112. When the planetary gear shaft 1118 rotates together with the differential case 1112, the left and right bevel gears 1116 and 1124 rotate on the left and right drive shafts 1061 and 1027 respectively at the same rotation speed. However, due to the torque vectoring motor 1038 has not received any electrical signal, the torque vectoring motor 1038 does not start, and the torque vectoring apparatus 1040 does not output any torque, which does not affect the normal operation of the differential 1019. At this time, the torque vectoring relationship is shown in FIG. 11. However, when the car is out of stable for encountering interference, according to the actual situation the vehicle controller can send torque vectoring instruction, thus the motor controller can control the inner rotor 1095*a* of the torque vectoring motor 1038 to rotate forward or reverse, so that the drive torque is directionally distributed to the left drive shafts (i.e. the left drive shaft 1061 with left gear and the left shaft 1076 connected to the left flange) and the right drive shaft 1027. In this case, a yaw moment of couple will be produced to correct vehicle position to ensure the stability of straight running. At this time, the torque vectoring relationship is shown in FIG. 12.

Figure 12:
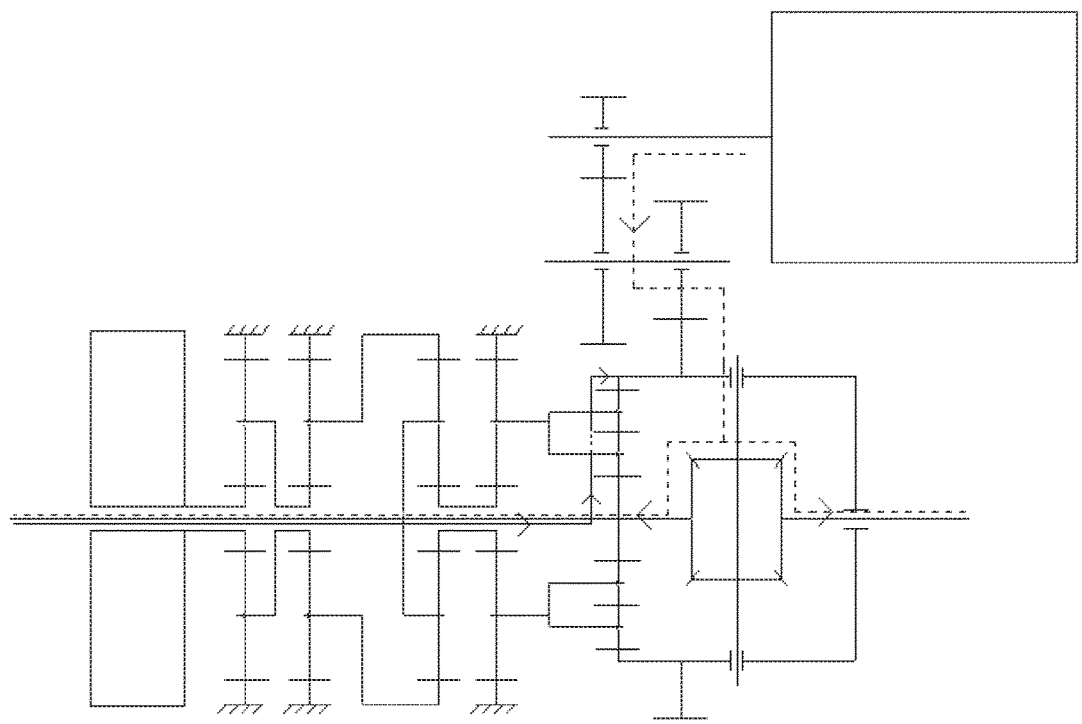
FIG. 12 is a schematic diagram of power flow of the drive axle with torque vectoring function of the present invention when the car turns right.

As shown in FIG. 12, when the vehicle is cornering, especially at a high speed, the motor controller will send an electrical signal to the torque vectoring motor 1038 of the torque vectoring apparatus 1040, and the inner rotor of the torque vectoring motor 1038 starts rotating. At the role of the torque vectoring apparatus 1040, more torque will be directionally transferred to the outside wheels. If the rotation direction of the wheel while the car running is defined as a positive direction, when the car enters a right corner, the left wheels of the car and left drive shafts (i.e. the left drive shaft 1061 with the left gear and left shaft 1076 connected to left flange) rotate faster than the right wheels and the right drive shaft 1027 of the car. The rotation speed difference will be more than that of normal cornering determined by the differential, which will lead to transmit more drive torque to the outside wheels. Specifically, when the torque vectoring motor 1038 of the torque vectoring apparatus 1040 receives an electrical signal, the inner rotor 1095*a* of the torque vectoring motor 1038 and the sun gear 1095*b* rotate in the positive direction. The planetary gear 1071 of the left reduction planetary gear train of double row planetary gear reduction mechanism 1011*a* revolves in a positive direction. The carrier 1072*a* revolves in a positive direction. The sun gear 1072*b* connected with the carrier 1072*a* also rotates in a positive direction. The planetary gear 1074 of the right reduction planetary gear train of the double row planetary gear reduction mechanism 1011*a* revolves in a positive direction. The planetary gear 1082 of the left torque vectoring planetary gear train 1011*b* of the double row planetary gear torque vectoring mechanism 1039 rotates in a positive direction, while the planetary gear 1055 of the right torque vectoring planetary gear train 1014*a* revolves in a negative directional opposite to the positive direction. Namely, the carrier 1056 will produce rotational resistance to hinder the differential case 1112. In fact, both the double row planetary gear reduction mechanism 1011*a* and the double row planetary gear torque vectoring mechanism 1039 function to amplify the drive torque. Therefore, the torque applied to the carrier 1056 is much larger than the torque applied to the inner rotor 1095*a* and the sun gear 1095*b* by the torque vectoring motor 1038, which can reduce size of the torque vectoring motor. In this case, the planetary gears 1057 and 1064 of the single row double planetary gear coupling mechanism 1014*b* no longer freely rotate with respective to the ring gear 1058 and the sun gear 1061*b* of the single row double planetary gear coupling mechanism 1014*b*. Due to the rotation resistance applied to the differential case 1112 by the carrier 1056, the carrier 1056 transmits the torque received from the torque vectoring motor 1038 to the sun gear 1061*b* and the left drive shafts (i.e. the left drive shaft 1061 with left gear and the left shaft 1076 connected to left flange) via the differential case 1112, so that the torque applied to the left drive shafts (i.e. the left drive shaft 1061 with left gear and the left shaft 1076 connected to left flange) is much larger than that applied to the right drive shaft 1027 drive torque. In other words, via the planetary gears 1057 and 1064 and the sun gear 1061*b*, the ring gear 1058 connected with the differential case provides the left shaft 1076 with higher speed. Therefore, at this time, the torque vectoring apparatus 1040 functions as an overspeed device of the left shaft 1076. If the car enters a left corner, the motor controller sends an electrical signal to the torque vectoring motor 1038 to rotate in the negative direction. The inner rotor 1095*a* and the sun gear 1095*b* start reversing rotation. At this time, the planetary gear 1055 of the right torque vectoring planetary gear train 1014*a* of the double row planetary gear torque vectoring mechanism 1039 generates a promotion force to the differential case 1112 for rotation. Therefore, under the control of the torque vectoring apparatus 1040, more drive torque will be transmitted from the differential case 1112 to the right drive shaft 1027.

Therefore, in general, the larger the torque of the torque vectoring motor 1038 of the torque vectoring apparatus 1040 during positive direction rotation is, the more will the torque be transmitted to the left shaft 1076 via the primary driven gear 1041.

The role of the torque vectoring apparatus 1040 depends on several conditions, and all of these conditions may be monitored by the sensors mounted on the vehicle, and processed by a processor to control the electronic signal sent to the torque vectoring motor 1038. These conditions monitored includes vehicle speed, yaw rate, lateral and longitudinal acceleration of the vehicle, the steering angle, wheel slip ratio, engine and transmission operating parameters, and temperature of the torque vectoring motor 1038 and the like.

In addition, just as the case that the vehicle running straight is out of stable for encountering interference, if the vehicle turns into the slippery pavement or some other poor pavement, when there is a need to directionally distribute the torque to the left shaft 1076 and the right drive shaft 1027 according to the specific road condition, the torque vectoring motor 1038 of the torque vectoring apparatus 1040 is capable of receiving an electrical signal, and the drive torque is directionally distributed to the left shaft 1076 and the right drive shaft 1027 according to road conditions for stable travelling of the vehicle.

Although the embodiments of the present invention has been disclosed above, but it is not limited to the applications listed in the specification and embodiments. The disclosure can be applied to various fields suitable for the present invention. Modifications and variations can be easily made by one of ordinary skill in the art. Therefore without departing from the general concept of the scope of the claims and the equivalents as defined, the present invention is not limited to the specific details and drawings illustrated and described herein.

The invention claimed is:

1. An electric drive axle, comprising:
  a drive motor having an output shaft for outputting torque;
  a main reducer for performing two-stage reduction to amplify the torque outputted from the output shaft; wherein the main reducer comprises a primary drive gear with a first gear shaft connected with the output shaft, a primary driven gear driven by the primary drive gear, a secondary drive gear sharing a second gear shaft with the primary driven gear, and a second driven gear driven by the second drive gear;
  a differential for distributing the amplified torque received from the main reducer to a first and second drive shafts; wherein the differential comprises a differential case fixedly connected to the second driven gear, a planetary gear shaft, a first and second planetary gears respectively arranged on two ends of the planetary gear shaft, and a first and second bevel gears respectively connected with the first and second drive shafts;
  a torque vectoring apparatus for torque vectoring; and
  a drive axle housing having a first, second and third cavities; wherein the first and second cavities are coaxially arranged and communicated, and the second and third cavities are radially connected; and the torque vectoring apparatus is mounted in the first cavity, the differential is mounted in the second cavity, and the main reducer is mounted in the second and third cavities;
  wherein the torque vectoring apparatus comprises:
    a torque vectoring motor having an inner rotor for outputting torque;
    a planetary gear reduction mechanism for receiving the torque from the inner rotor of the torque vectoring motor, and reducing the speed to amplify the torque;
    a torque vectoring mechanism connected to said planetary gear reduction mechanism, for receiving the torque from the planetary gear reduction mechanism, and outputting the reverse torque in contrast to said torque received from the planetary gear reduction mechanism; and
    a planetary gear coupling mechanism, comprising:
      a first planetary carrier for receiving said reverse torque from the torque vectoring mechanism;
      a first ring gear fixedly connected with the differential case, wherein the first ring gear and the differential case are configured to rotate together; and
      a first sun gear fixedly connected with the first drive shaft.

2. The electric drive axle according to claim 1, wherein the planetary gear reduction mechanism comprises a first reduction planetary gear train and a second reduction planetary gear train arranged in series, which have a common ring gear fixed on the drive axle housing; a second planetary carrier of the first reduction planetary gear train and a third sun gear of the second reduction planetary gear train are fixedly connected; a second sun gear of the first reduction planetary train and the inner rotor of the torque vectoring motor are fixedly connected; a third planetary carrier of the second reduction planetary gear train is configured to output power.

* * * * *